D. J. Owen.
103767  Animal Trap.  Patented May 31 1870

Witnesses.

D. J. Owen
Inventor

United States Patent Office.

DENNIS J. OWEN, OF SPRINGVILLE, PENNSYLVANIA.

Letters Patent No. 103,767, dated May 31, 1870.

IMPROVED ANIMAL TRAP.

The Schedule referred to in these Letters Patent and making part of the same.

*To all whom it may concern:*

Be it known that I, DENNIS J. OWEN, of Springville, in the county of Susquehanna and State of Pennsylvania, have invented an Improved Animal Trap; and I do hereby declare that the following is a full, clear, and exact description thereof, reference being had to the annexed drawing making part of this specification, in which—

The same letters are used in all the figures in the designation of identical parts.

This invention relates to animal traps; and

My improvement consists in a simplified construction and arrangement of the parts constituting such a device, as will more fully appear from the following specification and claim.

To enable those skilled in the art to make and use my invention, I will proceed to describe its construction and operation.

In the annexed drawing—

A represents the body or case of the trap, having, in this instance, one cavity, A', in which the bait is placed.

Upon the open end of this case the stationary jaw B is secured, extending above its upper surface for some distance. Where it covers a portion of the cavity, it is serrated, as shown at *b*, presenting a number of sharp points. The swinging jaw B' is pivoted to the upper end of the stationary jaw, it being similarly serrated at its inner edge, at *b'*, about opposite the teeth on the jaw B, and increases in width from its pivoted end to a point about opposite its serrations, from which point it is rounded off, as clearly shown.

Figure 1:
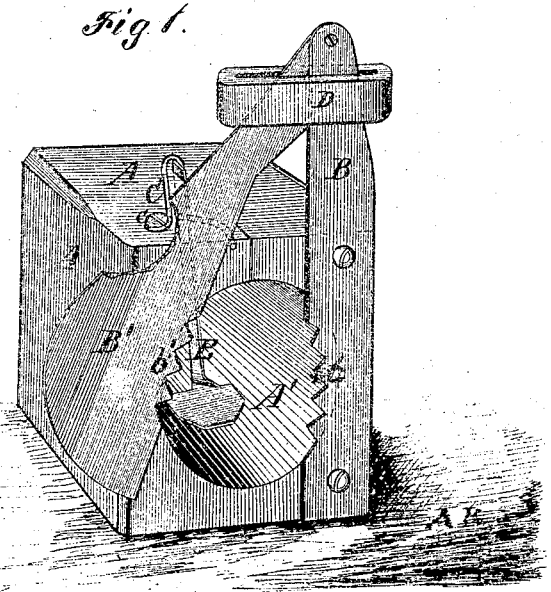
Figure 1 is a perspective view of the trap set.

C is an angled lever pivoted upon a stud, *c*, upon the upper surface of the case A, one of its arms extending rearward, and terminating in a hook, while its other arm leaves the fulcrum point at about a right angle to the former, and may be slightly curved outward at its forward end. This lever is so arranged, with reference to the swinging jaw B' and the swinging bait-bar E, that, in setting the trap, its hooked arm embraces the upper end of the bait-bar, while its other arm extends to just beyond the line in which the edge of the swinging jaw moves, and holds this latter in the position shown in fig. 1, so as to leave a sufficient opening between the two jaws for the animal to enter the cavity in the case.

D represents a slotted weight, which, in setting the trap, is placed over the jointed ends of the jaws. Immediately on releasing the swinging jaw from the arm of lever C the weight will slip down the jaws, bringing them together to hold whatever game may have entered the cavity in the case between their teeth.

Figure 2:
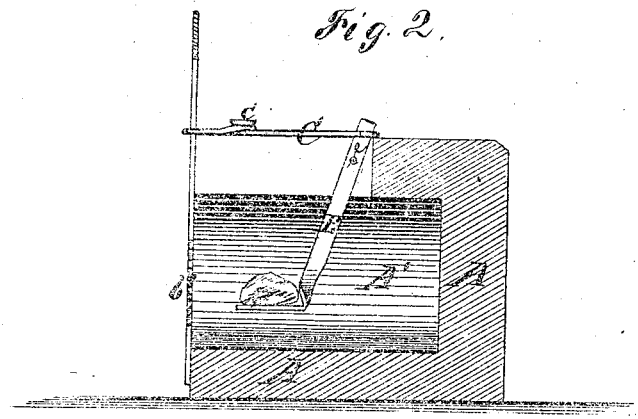
Figure 2 is a vertical longitudinal section thereof.

E represents the swinging bait-bar above referred to, which is pivoted at *e* in the upper wall of the case, extending far enough above the same to be caught by the hooked arm of lever C, and below the same into the cavity in the case to receive the bait. It will be seen, by reference to fig. 2, that, when the trap is set, the bait end of the bar is thrown well forward, and a very slight push will turn it on its pivot sufficiently to release its upper end from the hook of lever C, which, having nothing further to hold it, will be caused to turn on its stud by the swinging jaw and the weight, and the trap be closed by the latter.

It is evident that several traps of the above construction may be used with a single case, by simply making such case many sided and with a number of cavities.

What I claim as my invention, and desire to secure by Letters Patent, is—

An animal trap, combining in its construction a case, A, the stationary jaw B, swinging jaw B', weight D, angled lever C, and bait-bar E, substantially as set forth.

In testimony whereof I have signed my name to this specification in the presence of two subscribing witnesses.

D. J. OWEN.

Witnesses:
MILES PRICHARD,
L. L. OWEN.